Patented Dec. 3, 1935

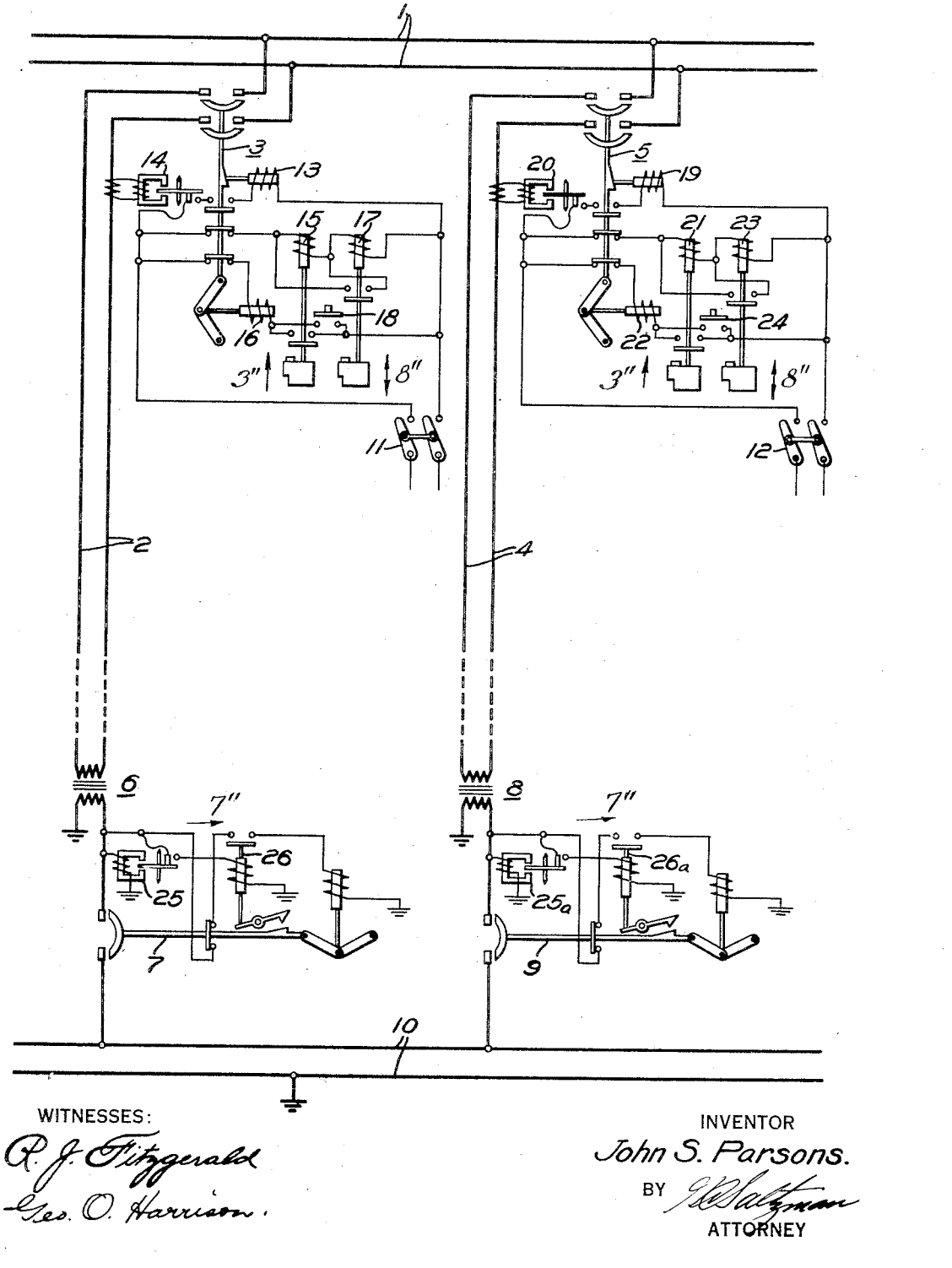

2,023,096

UNITED STATES PATENT OFFICE 2,023,096

SYSTEM OF DISTRIBUTION

John S. Parsons, Swissvale, Pa., assignor to Westinghouse Electric & Manufacturing Company, East Pittsburgh, Pa., a corporation of Pennsylvania Application June 17, 1932, Serial No. 617,831

12 Claims. (Cl. 175—294)

My invention relates to protective apparatus and particularly to such apparatus for use in distribution systems in which a plurality of feeders transmit power from one or more sources to a common distribution circuit or network.

In my copending application, Serial No. 617,830, filed June 17, 1932, and assigned to the Westinghouse Electric and Manufacturing Company, I have disclosed automatic circuit breaker apparatus which is particularly applicable to secondary network distribution systems. In accordance with the principle of the above-mentioned application, the secondary network is entirely disconnected upon the occurrence of a fault on one of the feeders of the system, and the circuit breakers of the system are thereafter automatically reclosed in a sequence which results in the disconnection of the faulty feeder and the operative connection of one or more of the unfaulted feeders.

The system disclosed in the above mentioned application is reliable and satisfactory but is subject to the disadvantage that when a fault occurs on a feeder, the circuit breaker associated with the faulty feeder does not necessarily reclose after its initial opening. As feeder faults are in many cases arcs which are extinguished upon the initial opening of the feeder circuit breaker, it is desirable to re-close all feeder breakers automatically at least once to thereby avoid needless manual reclosures. In the system disclosed in the above-mentioned application also, a number of interlocking control circuits for the closing coils of the circuit breakers of the system are required. Such interlocking circuits are satisfactory where the feeders supplying the distribution circuit all originate in the same substation or generating station, but are objectionable because of the additional wiring, where the feeders originate in different substations or generating stations.

It is accordingly an object of my invention to provide a novel protective system of the same general character as that disclosed in my copending application Serial No. 617,830 mentioned above, but in which all feeder circuit breakers shall be automatically reclosed at least once after opening thereof.

Another object of my invention is to provide novel and simple protective apparatus for distribution systems having a plurality of feeders for supplying power to a common network load circuit, in which the network circuit shall be entirely disconnected upon the occurrence of a fault on one of the feeders and thereafter the connection of the unfaulted feeders to the network shall be delayed for a time interval sufficient to permit the permanent disconnection or locking-out of the faulty feeder if the fault on the latter has not cleared in response to opening of its associated circuit breaker.

Other objects of my invention will become evident from the following detailed description taken in conjunction with the accompanying drawing, in which the single figure is a diagrammatic view of a distribution system embodying my invention.

Referring to the figure in detail, a high voltage supply circuit or station bus 1 may be connected to a pair of feeders 2 and 4 by means of a pair of circuit breakers 3 and 5 respectively. The feeders 2 and 4 are connected to the high voltage sides of banks of transformers indicated diagrammatically at 6 and 8. The low voltage sides of the banks of transformers 6 and 8 may be connected to a network load circuit 10 by means of a pair of network switches 7 and 9 respectively.

The control circuits associated with circuit breaker 3 may be connected to a suitable direct current source (not shown) by means of a switch 11. Similarly, the control circuits associated with the circuit breaker 5 may be connected to a suitable direct current source (not shown) by means of a switch 12.

The circuit breaker 3 is provided with a trip coil 13 connected in a circuit which includes front pallet contact members of the circuit breaker 3 and contact members of any suitable fault responsive means 14, which I have illustrated diagrammatically as an over-current relay of the induction-disc type. The over-current relay 14 preferably operates with a time delay and may be of the definite time-element, inverse time-element or inverse time-element with definite-minimum time types known in the art.

A timing relay 15 of delayed-closing instantaneous-opening type, is provided for controlling the circuit of the closing coil 16 of the circuit-breaker 3. The coil of the timing relay 15 is connected in a common circuit with the coil of a time-delay relay 17 of delayed-closing, delayed-opening type. The relay 17 is provided with contact members for short-circuiting the coil of the timing relay 15. A push button 18 is provided for completing a circuit for the closing coil 16 independent of the contact members of the timing relay 15.

The circuit breaker 5 is provided with a trip coil 19 connected in a circuit which includes contact members of an over-current relay 20 similar to the over-current relay 14, and front pallet contact members of the circuit breaker 5.

A timing relay 21 of delayed-closing instantaneous-opening type, similar to the timing relay 15, is provided for controlling the circuit of the closing coil 22 of the circuit breaker 5. The coil of the timing relay 21 is connected in a common circuit with the coil of a time delay relay 23 of delayed-opening, delayed-closing type. The relay 23 is provided with contact members for short-circuiting the coil of the timing relay 21. A push-button 24 is provided for completing a circuit for the closing coil 22 independent of contact members of the timing relay 21.

A pair of time-element relays 25 and 25a, of delayed-closing, instantaneous-opening type, which I have illustrated diagrammatically as induction-disc relays, are connected to respond to the voltages across the low-voltage terminals of the banks of transformers 6 and 8 respectively. The contact members of the time-element relays 25 and 25a control a pair of low-voltage relays 26 and 26a. The low voltage relays 26 and 26a are connected to complete closing circuits for the network switches 7 and 9, respectively, in closing, and are arranged to trip open their respective network switches 7 or 9, in dropping out.

The low-voltage relays 26 and 26a are designed to close when the voltage at the secondary terminals of the corresponding transformer bank 6 or 8 is a predetermined percentage of normal voltage, for example 80%, and to drop out when the voltage at the secondary terminals of the transformer bank 6 or 8 falls below a predetermined minimum, for example 15% of normal voltage.

The timing relays 15 and 21 may have the same or different time elements. The time elements of the time-delay relays 17 and 23 may be the same or different, but are greater than the time elements of the associated timing relay 15 or 21, respectively. The time-delay relays 17 and 23 must be of such type that momentary deenergization of their coils does not reset their timing mechanism. The time elements of the time-element relays 25 and 25a may be the same or different but must be greater than the difference between the time-element of the timing relay 15 or 21 and the time element of the corresponding time-delay relay 17 or 23 associated with the corresponding feeder.

For purposes of illustration, the time elements of timing relays 15 and 21 will each be assumed as 3 seconds, the time elements of the time delay relays 17 and 23 will each be assumed as 8 seconds, and the time element of the time-element relays 25 and 25a, which must be greater than the difference between 8 and 3 seconds will be assumed as 7 seconds. It will be understood that these values are chosen arbitrarily for purposes of illustration only, and that in practice values differing greatly therefrom may be used.

The time required for operation of either of the time-element over-current relays 14 or 20 is comparatively short as compared with the time-elements of any of the relays 15, 17, 21, 23 or 25, and may be assumed as a fraction of a second.

The operation of the above-described apparatus may be set forth as follows: The switches 11 and 12 are first closed to prepare the apparatus for automatic operation. Upon the closure of switch 11 a circuit is completed for the timing relay 15 and the time delay relay 17. Upon the closure of switch 12, a circuit is completed for the timing relay 21 and the time delay relay 23.

The timing relays 15 and 21 and the time-delay relays 17 and 23 now all commence to operate toward closed positions. At the expiration of 3 seconds, the timing relays 15 and 21 close to complete circuits for the closing coils 16 and 22. Upon completion of the latter circuits, the circuit breakers 3 and 5 close.

The circuit breakers 3 and 5, in closing, interrupt the circuits of the timing relays 15 and 21 and the time delay relays 17 and 23, and connect the feeders 2 and 4 to the supply circuit or station bus 1.

Upon interruption of the circuits of the timing relays 15 and 21 and the time delay relays 17 and 23, the timing relays 15 and 21 drop out substantially instantaneously, but the time-delay relays 17 and 23 slowly operate under control of their respective timing devices, toward fully open positions.

In response to the connection of feeders 2 and 4 to the supply circuit 1, the transformer banks 6 and 8 become energized and the time element relays 25 and 25a commence to operate toward closed positions.

At the expiration of 8 seconds after the closure of circuit breakers 3 and 5, the time-delay relays 17 and 23 reach fully open positions. At the expiration of 7 seconds after closure of circuit breakers 3 and 5, the time-element relays 25 and 25a close to cause the closure of the low-voltage relays 26 and 26a respectively and the network switches 7 and 9.

If a fault occurs on the feeder 2, power is fed to the fault through the feeder 2 and also through the feeder 4, transformer bank 8, the distribution circuit 10, and the transformer bank 6. The over-current relays 14 and 20 accordingly both operate at the expiration of their time intervals to trip open the circuit breakers 3 and 5.

Upon the opening of circuit breaker 3, a circuit is completed for the timing relay 15 and the time-delay relay 17, and the latter relays commence to operate toward closed position.

Upon the opening of circuit breaker 5, a circuit is completed for the timing relay 21 and the time-delay relay 23, and the latter relays also commence to operate toward closed position.

As the opening of circuit breakers 3 and 5 completely deenergizes the network load circuit 10, the voltage applied to the low voltage relays 26 and 26a falls below the 15% normal value necessary to maintain these relays closed. The relays 26 and 26a accordingly drop out to open the network switches 7 and 9.

At the expiration of 3 seconds, the timing relays 15 and 21 close to reclose the circuit breakers 3 and 5.

Assuming that the fault has not cleared, circuit breaker 3 again trips open. However, as the power path to the fault through feeder 4 is now open at network switches 9 and 7, the circuit breaker 5 remains closed.

Because of the energization of the transformer bank 8, the time element relay 25a associated with the latter transformer bank commences to operate to closed position.

In the meanwhile, at the expiration of substantially 6 seconds after its initial opening, the circuit breaker 3 again recloses and, assuming the fault condition still exists, again trips open. Two seconds later the time-delay relay 17 closes to lock out the circuit breaker 3 by short-circuiting the coil of the timing relay 15.

At the expiration of 7 seconds after the reclosure of circuit breaker 5, (10 seconds after the initial opening of circuit breakers 3 and 5) the time-element relay 25a associated with the transformer bank 8, completes its closing operation to re-close the network switch 9.

The feeder 2 may now be repaired and after completion of the repairs may be re-closed by operation of the push button 18.

It will be understood that if the fault on feeder 2 has cleared before any automatic re-closure of circuit breaker 3, the latter will remain closed after reclosure, and at the expiration of 7 seconds, the time-element relay 25 associated with the transformer bank 6 will operate to close the network switch 7.

The operation of the system in response to a fault on feeder 4 will be obvious from that described above with reference to a fault on feeder 2.

The above-described embodiment of my invention has for simplicity been illustrated in connection with a single-phase distribution system. It will be apparent, however, that the invention is equally applicable to polyphase systems. It will also be apparent that although for simplicity I have shown a single high-voltage circuit for supplying the power transmitted by all of the feeders, the invention is equally applicable to systems in which the power is supplied from a plurality of sources. It will also be apparent that although for simplicity I have shown only one transformer and network switch connected to each of the feeders 2 and 4, in practice a plurality may be so connected.

I do not intend that the present invention shall be restricted to the specific structural details, arrangement of parts or circuit connections herein set forth as various modifications thereof may be effected without departing from the spirit and scope of my invention. I desire therefore, that only such limitations shall be imposed as are indicated in the appended claims.

I claim as my invention:

1. In an alternating-current network distribution system having a network load circuit supplied by means of a plurality of feeder circuits, the method of controlling the energization of a feeder circuit which comprises deenergizing the feeder circuit upon the occurrence of a fault thereon by disconnecting the feeder circuit at its supply end within a time interval of predetermined value and disconnecting the feeder circuit at its load end, reconnecting the feeder circuit at its supply end, and thereafter reconnecting the feeder circuit at its load end only if the feeder circuit is energized after the lapse of a time interval of at least said predetermined value, whereby connection of the load circuit to a faulted feeder is prevented.

2. In a network distribution system, a network distribution circuit, a plurality of feeder circuits for supplying power to said distribution circuit, a plurality of circuit breakers associated with said feeder circuits for controlling the flow of power therethrough, transformers included in said feeder circuits, a plurality of switches for controlling the power flow through said transformers, control means for said circuit breakers including opening means responsive to feeder faults, and switch control means for each of said switches operable automatically to effect the opening and closure thereof, each of said switch control means including reclosing means operable only when the corresponding feeder circuit is energized, said reclosing means including time-delay means for retarding the reclosure of the corresponding switch for a longer time interval than the time required for operation of said opening means.

3. In a distribution system, a supply circuit, a network distribution circuit, a feeder for transmitting power between said circuits, a circuit breaker for controlling the interchange of power between said supply circuit and said feeder, a switch interposed between said feeder and said distribution circuit, fault responsive means for opening said breaker, means for reclosing said breaker, means responsive to an electrical condition at said switch for opening said switch when said breaker is open and said network distribution circuit is deenergized and for automatically reclosing said switch when said breaker is closed and means for preventing the automatic reclosure of said switch for an interval of time after reclosure of said breaker.

4. In a distribution system, a supply circuit, a network distribution circuit, a feeder for transmitting power between said circuits, a circuit breaker for controlling the interchange of power between said supply circuit and said feeder, a switch interposed between said feeder and said distribution circuit, time-element fault responsive means for opening said breaker, means for automatically reclosing said breaker after opening thereof, means responsive to an electrical condition at said switch for opening said switch when said breaker is open and said network distribution circuit is deenergized and for automatically reclosing said switch when said breaker is closed and means for preventing the automatic reclosure of said switch, for a time interval greater than the time element of said fault responsive means, after reclosure of said breaker.

5. In a distribution system, a supply circuit, a network distribution circuit, a feeder for transmitting power between said circuits, a circuit breaker for controlling the interchange of power between said supply circuit and said feeder, a switch interposed between said feeder and said distribution circuit, fault responsive means for opening said breaker, means for repeatedly reclosing said breaker after each opening thereof and control means for said switch effective to open said switch when said breaker is open and said network distribution circuit is deenergized and effective after said breaker has been closed for a predetermined interval of time to automatically reclose said switch.

6. In a distribution system, a supply circuit, a network distribution circuit, a feeder for transmitting power between said circuits, a circuit breaker for controlling the interchange of power between said supply circuit and said feeder, a switch interposed between said feeder and said distribution circuit, fault responsive means for opening said breaker, means for repeatedly reclosing said breaker after each opening thereof for a predetermined number of times and means responsive to an electrical condition at said switch for opening said switch when said breaker is open and said network distribution circuit is deenergized and effective after said breaker has been closed for a predetermined interval of time to automatically reclose said switch.

7. In a distribution system, a supply circuit, a network distribution circuit, a feeder for transmitting power between said circuits, a circuit breaker for controlling the interchange of power between said supply circuit and said feeder, a switch interposed between said feeder and said distribution circuit, fault responsive means for opening said breaker, reclosing means for reclosing said breaker at the expiration of a predetermined interval of time after each opening thereof, lock-out means for rendering said reclosing means ineffective after a predetermined number of operations thereof and means responsive to an electrical condition at said switch for opening said switch when said breaker is open and said network distribution circuit is deenergized and effective after said breaker has been closed for a predetermined interval of time to automatically reclose said switch.

8. In a distribution system, a network distribution circuit, a plurality of feeders in power transmission connections with said distribution circuit, a plurality of circuit breakers associated with said feeders for controlling the flow of power therethrough, a plurality of switches for controlling the interchange of power between said feeders and said distribution circuit, fault responsive means for opening said breakers, means for reclosing each of said breakers, means responsive to the electrical condition of said feeders for opening each of said switches when the corresponding one of said feeders is in a predetermined ineffective condition and said network distribution circuit is deenergized and for automatically reclosing each of said switches when the corresponding one of said feeders is operatively energized and means for preventing the automatic reclosure of each of said switches for an interval of time after the corresponding feeder becomes operatively energized.

9. In a distribution system, a distribution circuit, a plurality of feeders in power transmission connection with said distribution circuit, a plurality of circuit breakers associated with said feeders for controlling the flow of power therethrough, a plurality of switches for controlling the interchange of power between said feeders and said distribution circuit, fault responsive means for opening said breakers, individual reclosing means for each of said breakers, each of said reclosing means being effective to repeatedly reclose the corresponding breaker after each opening thereof for a predetermined number of times, means responsive to an electrical condition of said feeders for opening each of said switches when the corresponding one of said feeders is in a predetermined ineffective condition and said network distribution circuit is deenergized and for automatically reclosing each of said switches when the corresponding one of said feeders is operatively energized and means for preventing the automatic reclosure of each of said switches, for a time interval sufficient to permit complete operation of any of said reclosing means, after the corresponding feeder becomes operatively energized.

10. In a distribution system, a distribution circuit, a plurality of feeders in power transmission connection with said distribution circuit, a plurality of circuit breakers associated with said feeders for controlling the flow of power therethrough, a plurality of switches for controlling the interchange of power between said feeders and said distribution circuit, fault responsive means for opening said breakers, individual reclosing means for each of said breakers, each of said reclosing means being effective to reclose the corresponding breaker at the expiration of a predetermined interval of time after each opening thereof, individual lock-out means for rendering each of said reclosing means ineffective after a predetermined number of operations thereof, means responsive to an electrical condition of said feeders for opening each of said switches when the corresponding one of said feeders is in a predetermined ineffective condition and for automatically reclosing each of said switches when the corresponding one of said feeders is operatively energized, and means for preventing the automatic reclosure of each of said switches for a time interval sufficient to permit operation of any of said lock-out means, after the corresponding feeder becomes operatively energized.

11. In a distribution system, a distribution circuit, a plurality of feeders in power transmission connection with said distribution circuit, a plurality of circuit breakers associated with said feeders for controlling the flow of power therethrough, a plurality of switches for controlling the interchange of power between said feeders and said distribution circuit, over-current fault responsive means for opening said breakers, individual reclosing means for each of said breakers, each of said reclosing means being effective to reclose the corresponding breaker at the expiration of a predetermined interval of time after each opening thereof, individual lock-out means for rendering each of said reclosing means ineffective after a predetermined number of operations thereof, means responsive to the voltage of said feeders for opening each of said switches when the corresponding one of said feeders is substantially de-energized and for automatically reclosing each of said switches when the corresponding one of said feeders is operatively energized and means for preventing the automatic reclosure of each of said switches, for a time interval sufficient to permit operation of any of said lock-out means, after the corresponding feeder becomes operatively energized.

12. In a network distribution system, a network distribution circuit, a plurality of feeder circuits for supplying power to said distribution circuit, a plurality of circuit breakers associated with said feeder circuits for controlling the flow of power therethrough, fault responsive means for opening said breakers, means for reclosing each of said breakers, transformers included in said feeder circuits, a plurality of switches for controlling the power flow through said transformer, means responsive to voltage conditions of said circuits for opening each of said switches when the corresponding one of said feeders is in a predetermined ineffective condition and said network distribution circuit is deenergized and for automatically reclosing each of said switches when the corresponding one of said feeders is operatively energized, and means for preventing the automatic reclosure of each of said switches for an interval of time after the corresponding feeder becomes operatively energized.

JOHN S. PARSONS.